Figure 1:
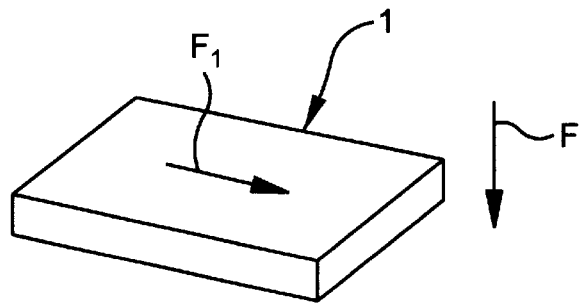

United States Patent
Gille et al.

[11] Patent Number: 6,138,479
[45] Date of Patent: Oct. 31, 2000

[54] METHOD FOR MAKING AN ARTICLE HAVING A GRADIENT OF COMPOSITION

[75] Inventors: Claude F. M. Gille, Chateau Landon; Alain Kerdoncuff, Vincennes; Michel Prassas, Vulaines sur Seine, all of France

[73] Assignee: Corning Incorporated, Corning, N.Y.

[21] Appl. No.: 09/011,839

[22] PCT Filed: Aug. 7, 1996

[86] PCT No.: PCT/US96/12916

§ 371 Date: Feb. 13, 1998

§ 102(e) Date: Feb. 13, 1998

[87] PCT Pub. No.: WO97/09278

PCT Pub. Date: Mar. 13, 1997

Related U.S. Application Data

[60] Provisional application No. 60/009,854, Jan. 16, 1996.

[30] Foreign Application Priority Data

Sep. 4, 1995 [FR] France ................................. 95/10343

[51] Int. Cl.[7] ...................... C03B 37/018; C03B 27/012
[52] U.S. Cl. .............................. 65/415; 65/416; 65/32.5; 65/99.1; 65/100; 264/1.32; 428/425.6; 428/1.7
[58] Field of Search ........................... 264/1.32; 428/1.7; 65/17.2, 32.1, 32.2, 32.5, 37, 63, 66, 72, 90, 93, 98, 99.1, 100, 102, 106, 245, 253, 324, 325, 326, 406, 415, 416

[56] References Cited

U.S. PATENT DOCUMENTS

| | | | |
|---|---|---|---|
| 1,748,587 | 2/1930 | Smedley | 65/45 |
| 3,575,789 | 4/1971 | Siefert et al. | 65/36 |
| 3,804,690 | 4/1974 | Ohno et al. | 156/245 |
| 5,630,857 | 5/1997 | Xu et al. | 65/173 |
| 5,858,046 | 1/1999 | Allen et al. | 65/66 |
| 5,917,105 | 6/1999 | Xu et al. | 65/37 |

*Primary Examiner*—Stanley S. Silverman
*Assistant Examiner*—Jacqueline A. Ruller
*Attorney, Agent, or Firm*—Milton M. Peterson; Angela N. Nwaneri

[57] ABSTRACT

The present invention relates to a method of making a rectangular bar have a gradient composition. In optical or ophthalmic applications, the gradient of composition ensures formation of a corresponding gradient of optical property, such as refractive index or optical density. The glass material is manufactured using a device containing several reservoirs, all designed to contain glass in the fluid state. According to the invention, the composition of the glass varies from one reservoir to the other so that the refractive indices, for example, of the three compositions are different, with an incremental progression. The fluid glass is deposited one composition on top of the next and then heated, creating a certain degree of interdiffusion between the layers. The glass is then heat-treated to create the desired property profile.

8 Claims, 2 Drawing Sheets

METHOD FOR MAKING AN ARTICLE HAVING A GRADIENT OF COMPOSITION

Provisional Application No. 60/009,854 filed Jan. 16, 1996.

The present invention relates to a method and a device for the manufacture of a bar with rectangular cross section made of a material presenting a gradient of composition perpendicular to two opposite longitudinal sides of the bar and, more particularly, to such a method and a device which allow the manufacture of a glass bar having one characteristic, such as refractive index, optical density, ionic conductivity, etc., which presents a predetermined profile gradient, established as a result of a variation in its composition, perpendicular to said opposite sides of the bar.

Optical components are used today, such as lenses made of glass which presents a refractive index gradient which is parallel to the axis of the lens. To make such optical components, the starting material is a glass block whose composition varies along the axis of the component to be prepared, which variation is established using various techniques, such as ion exchange (see French Patent Application No. 2,504,515), impregnation with the so-called "sol gel" technique (see U.S. Pat. No. 5,069,700), the use of starting glass compositions made of powder (U.S. Pat. No. 4,883,522), the use of selectively doped porous glass (U.S. Pat. No. 4,620,861), the assembly by melting of platelets made of glass with varying composition (U.S. Pat. No. 4,929,065), or other techniques such as exposure to neutron radiation, deposition of glass in the vapor phase, etc, etc.

The techniques used in the past share the feature that they apply discontinuous manufacturing processes, that is, in lots; this continuity implies downtimes which have a negative effect on productivity and thus also on the lowering of production costs. The gradients of indices obtained also were found to be insufficient in some applications and the profile insufficiently controlled.

The present invention therefore has the purpose of implementing a method and providing a device which allows the manufacture of bars with rectangular cross section made of a material which presents a gradient of composition perpendicular to two opposite longitudinal sides of the bar, and notably bars made of glass for the preparation of optical components with an axial gradient of composition, which bars present none of the above-mentioned drawbacks of the known methods and devices.

This purpose of the invention is achieved, as well as others which will become apparent upon reading the following description, with a method for the manufacture of a bar with rectangular cross section made of a material presenting a gradient of composition perpendicular to two opposite longitudinal sides of the bar, which material is in the fluid phase at a temperature above ambient temperature, and which method is characterized in that a) at least the first and second compositions of this material are prepared in the fluid phase, b) a sheet of the first composition is poured continuously on a flat support, c) a sheet of the second composition is poured continuously on the sheet of the first composition, d) the interdiffusion of the materials of the two sheets by a thermal method is ensured so as to obtain the desired gradient of composition in the cooled bar.

With the method of the invention, a bar can be prepared in a continuous process, which bar consists of a material such as glass which presents the required transverse gradient of composition, where the continuity of the method allows for of high productivity and reduced manufacturing costs.

For the implementation of this method, the invention provides a device which comprises a support which advances on a looped travel path which presents a flat part, where a number of reservoirs each receive one of the compositions of an equal number of different compositions of the material each reservoir being equipped with means for the formation of a sheet of the material which flows by gravity from the reservoir, the reservoirs being spaced at intervals along the flat part of the travel path of the support so that said sheets flow out one above the other, above the support.

According to one embodiment of the device according to the invention, the device also comprises means for the transverse cutting of the bar formed into bar elements, heating means and means to load these elements in these heating means so as to ensure the development of the process of interdiffusion of the sheets of each element until the desired gradient of composition is established in said element.

Figure 2:
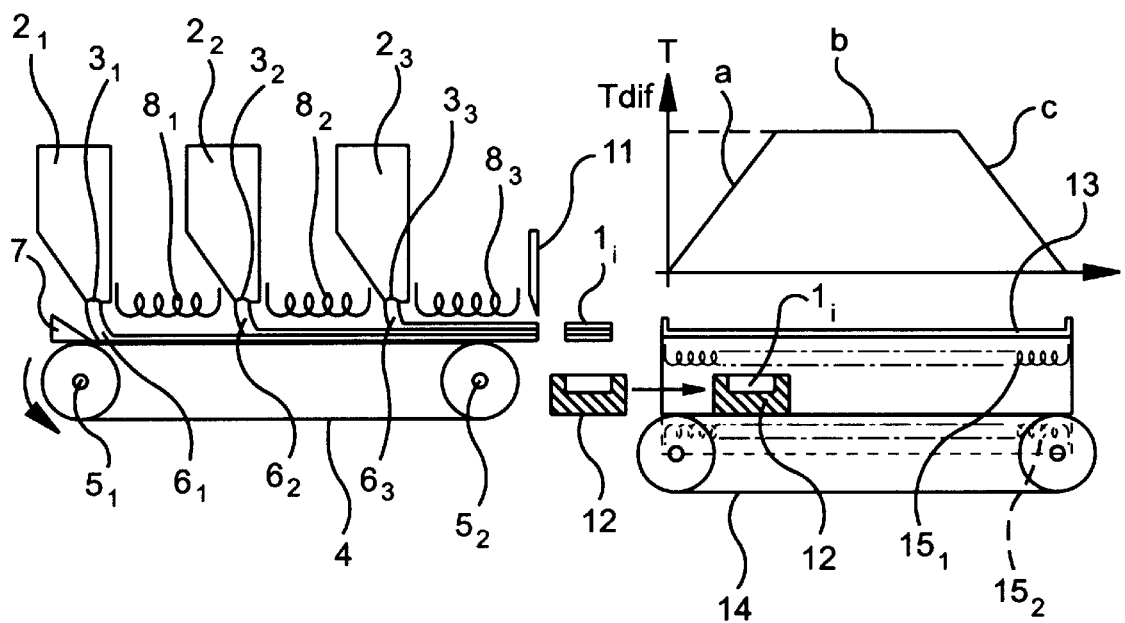
Figure 3:
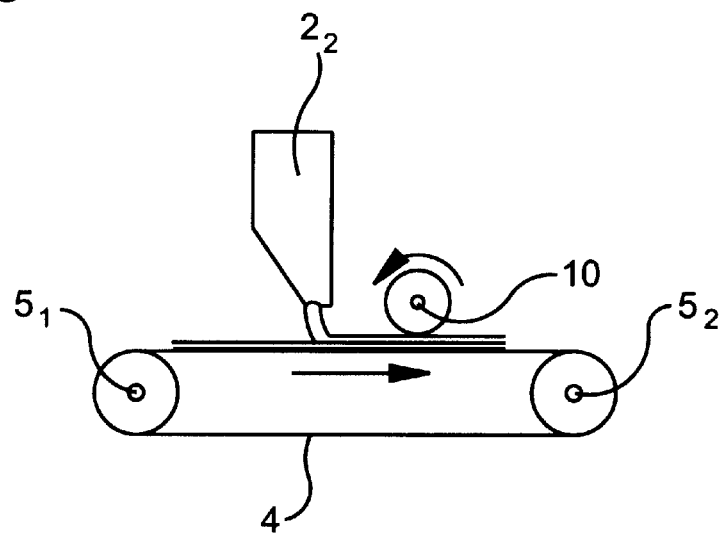
Figure 4:
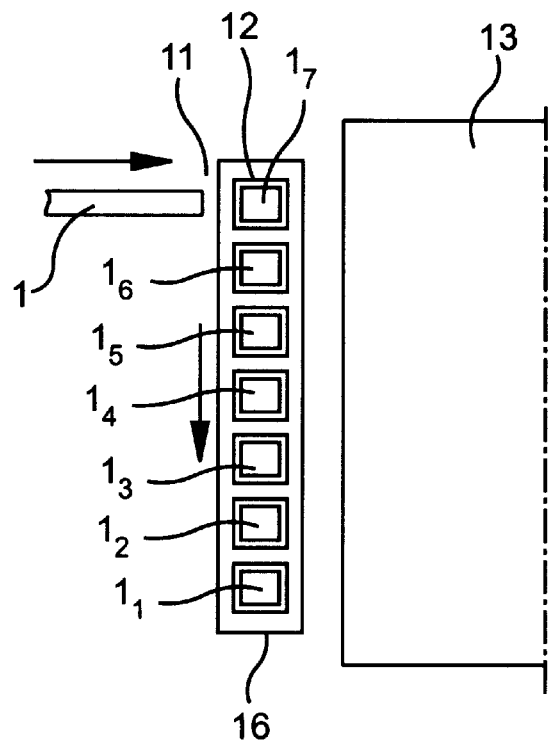

Other characteristics and advantages of the present invention will become apparent upon reading the following description and examining the drawing in the appendix in which:

FIG. 1 is a diagrammatic representation of the structure of a glass bar obtained by the method according to the present invention, FIG. 2 is a diagram of a device designed for the implementation of the method according to the invention, FIG. 3 is a diagram of a variant of a part of the device of FIG. 2, and FIG. 4 is a diagram illustrating the structure and the operation of the means for loading glass bar elements in heating means of the device of FIG. 2.

The present invention relates to the manufacture of a bar 1 (see FIG. 1) made of a vitreous material, in particular an optical or ophthalmic glass, presenting a rectangular cross section and a gradient of composition along arrow F, that is, along a direction perpendicular to the two opposite sides of said bar.

In the optical or ophthalmic applications considered primarily, but not exclusively, by this invention, the gradient of composition ensures the formation of a corresponding gradient of an optical property such as refractive index or optical density. By cutting the bar 1 transversely (either perpendicular to its axis, parallel to the arrow $F_1$) prepared according to the invention, into separate elements, preforms can be made, for example, of optical lenses which are then shaped by grinding and mechanical polishing, or by molding, and which present an optical axis which is parallel to the arrow F. These lenses then present, once they are finished, an axial gradient of the desired optical property, for example, the refractive index.

To prepare such lenses, the glass bar of FIG. 1 is first manufactured using the device represented in FIG. 2. The latter comprises n reservoirs $2_1$, $2_2$, $2_3$, (n=3 in the example represented), all designed to contain glass in the fluid state. Classically, the glass is maintained in this state by heating means (not shown) which are incorporated in the reservoirs.

According to the invention, the composition of the glass varies from one reservoir to the other so that the refractive indices, for example, of the three compositions, are different, with an incremental progression, for example.

The bottom of each reservoir $2_1$, $2_2$, $2_3$ is equipped with a casting slit $3_1$, $3_2$, $3_3$, respectively, designed to form a sheet of glass in the fluid state from the glass contained in the reservoir and to deposit this sheet onto a support 4, consisting, for example, of a belt which travels in a closed-loop path around two rollers $5_1$ and $5_2$ which define between them a flat travel path for the belt 4.

The reservoirs $2_1$, $2_2$ and $2_3$ and the slits $3_1$, $3_2$ and $3_3$ are spaced at intervals along this travel path so that the sheet of glass $6_1$ exiting from slit $3_1$ falls directly onto belt 4, possibly assisted by a shoe 7 placed at the drop point, so that sheet $6_2$ exiting from slit $3_2$ falls onto sheet $6_1$ placed on the belt, and sheet $6_3$ exiting from reservoir $3_3$ falls onto sheet $6_2$. Heating means $8_1$, $8_2$ and $8_3$ are arranged in parallel to belt 4 to maintain the sheets in paste-like condition (at a temperature much higher than the vitreous transition temperature $T_g$) as they are stacked on the belt. Walls (not shown), made of graphite, for example, limit the transverse extension of the sheets on the belt.

At the moment of the forming of the bar, the interface between the two sheets can be slightly arched because of the friction on the graphite walls and the effect of surface tension. This defect can be corrected, if necessary, using rollers, such as the lamination roller 10 shown in FIG. 3, placed downstream from each one of the slits, in contact with the sheet of material deposited through the slit.

One can see that in this manner that a composite glass bar with a rectangular cross section is formed, which leaves the belt 4 (to the right of the point of view represented in FIG. 2), the composition of this bar varying abruptly at the two interfaces between the sheets $6_1$ and $6_2$ on the one hand, and $6_2$ and $6_3$ on the other.

Indeed, the phenomenon of heat diffusion which can cause a certain degree of interdiffusion between the two sheets at each one of these interfaces during the stacking of the sheets on the belt has very low sensitivity because such a diffusion requires a high temperature and a long contact time. The glass bar which leaves the belt thus does not present a composition which varies progressively in the direction of its thickness, when it may in fact be desirable to establish such a progression for certain optical components with a gradient of refractive indices, for example.

As explained in French Patent Application No. 95,04646 filed on Apr. 19, 1995, by the applicant, the required gradient of composition can be obtained then by the interdiffusion at high temperature of chemical elements which are capable of significantly modifying the value of the refractive index of glass, as a function of their local concentration in the glass. The interdiffusion takes place at the interfaces of the glass sheets. The selection of the glasses for these sheets depends on the desired difference in indices and the required type of profile. In the extreme case where there is no interdiffusion, a profile with discontinuous composition is obtained (stepwise). With reference to FIG. 2 of the above-mentioned patent application, the appearance of "S" profiles of indices can be examined, which can be obtained by interdiffusion, the inflection point of the profile being located in the vicinity of an interface between glass sheets or layers.

To establish a gradient of indices which varies progressively over the entire thickness of glass bar 1 by means of the device according to the invention, the glass bar must undergo, at the exit point of belt 4, a heat treatment at high temperature (temperature of diffusion) for several tens of hours, for example.

According to a particular embodiment of the present invention, this treatment can be achieved by first cutting bar 1 into elements $1_1$, $1_2$, ... $1_i$ ... at a cutting station 11. This cutting operation is regular and it is conducted in the standard manner, with triggering by thermal shock or heat or sawing, as is well known. The length of the elements $1_i$ is selected, for example, as a function of the dimensions of optical lenses with a gradient of indices to be formed by grinding or polishing, or by molding, of the material for each element, which then constitutes a preform for the desired lens.

Preform $1_i$, so individualized, is placed by automatic mechanical means (not shown) in the mold 12 which then is conveyed into heating means 13 where the interdiffusion of the portions of sheets $6_1$, $6_2$ and $6_3$ which constitute the preform $1_i$ will take place. These means consist of an arch through which a moving belt 14 passes, which conveys the preform $1_i$, over the entire length of the arch, between heating elements $15_1$ and $15_2$.

The latter establish in the arch the temperature profile T shown in FIG. 2. This profile comprises a part a in which the temperature of the preform gradually increases up to the temperature $T_{dif}$ of diffusion, a part b which corresponds to the greatest part of the length of the arch, where the diffusion proper takes place, and a part c where the temperature of the preform $1_i$ is lowered to a value which allows the removal from the molds of the preforms at the exit of the arch, so that subsequent process can be performed on these preforms to make lenses from them with an axial gradient of indices, the axis of the lens being then oriented in parallel to the thickness of the preform (vertical, from the point of view of FIG. 2).

The parameters which allow the modification of the profile of indices obtained are the diffusion time (corresponding to the time it takes the preform to travel through the part of arch 13 which corresponds to the threshold b of the temperature profile T) and the positions of the interfaces of the sheets. By increasing the number n of the sheets, it is possible to shape the form of the profile more precisely and to obtain, for example, a parabolic profile. Regardless of the number of sheets, the densities of the glasses which comprise them must be selected so that they are stacked one atop the other in decreasing order of density so as to preserve the gradient during the passage in the arch, where the glass can return to the liquid phase because of the high temperature established in this arch. In the latter case, the lamination rollers described in connection with FIG. 3 are no longer necessary.

The positioning of the interfaces also depends on the thickness of the sheets. In this regard, the parameters which can be modified are the flow rates of the glass from reservoirs $2_i$ (and the ratios of these flow rates) as well as the speed of the belt 4, which can ensure a predetermined drawing of the sheets and thus a modification of their thicknesses. As an illustrative and nonlimiting example, the method and the device according to the invention allow the manufacture of 100 kg/h of preforms into a bar with a rectangular cross section 80×10 mm, formed of two glass sheets with a thickness of 5 mm (made of a commercial white glass or a lead-containing glass, for example).

For this purpose, an arch 13 with a length of 30 m is constructed, which is heated at a diffusion temperature of 1200° C. The mold which supports the preform is made of graphite or of boron nitride. An inert atmosphere (nitrogen, for example) is then required in the arch to ensure the maintenance of the temperature of the mold.

The glass bar exits the belt 4 at a speed of 1.157 cm/sec. The speed of the mold in the preform is 1 m/h for a residence time of 30 h. Since the speed (30 m/h) of belt 14 in the arch is slow compared to the exit speed of the glass bar from belt 4, it is advantageous to have loading means 16 in the arch of the preforms cut into the bar, which absorb the differences in the glass flows.

According to the present invention, these loading means 16 have the form shown in FIG. 4, which represents diagrammatically in a top view glass bar 1 exiting belt 4, to be cut at station 11. After the cutting, mechanical transfer means (not shown) place each preform in a mold, and the molds so loaded are aligned transversely to belt 14 of arch 13 before being placed on this belt. Thus, several preforms are heat treated in the arch in parallel. It is sufficient to select the width of the belt 14 which exactly adapts the flow rate of belt 4 to that of belt 14. With the numbers indicated above, this adaptation is obtained by placing preforms in molds side by side in arch 41 and in that case, belt 14 has an approximate width of 3.3 m.

It now becomes apparent that the invention does in fact realize the stated purpose, that is to provide a method and a device for the manufacture of elements with rectangular cross section made of a material presenting a gradient of composition perpendicular to two opposite sides of the element, which do not present the drawbacks of the discontinuous methods of the prior art. Thanks to its continuous character, the method according to the invention allows the increasing of productivity and the decreasing of production costs. It should also be noted that the method according to the invention allows the modification, by very simple means, of the composition of the bars by the addition of additional sheets, without changing the subsequent steps of heat treatment.

Naturally, the invention is not limited to the embodiment which has been described and represented only as an example. Thus, the invention is not limited to the manufacture of lenses with a gradient of refractive indices for optical or ophthalmic use; it can also be applied to the manufacture of filters with variable optical density or blocks of materials with variable ionic conductivity, for example.

What is claimed is:

1. A method of producing a bar of vitreous material having a rectangular cross-section, having two opposed, longitudinal sides, and having a compositional gradient perpendicular to those sides, the method being characterized by,
    a. providing at least a first glass having a given composition and a second glass having a different composition, both glasses being provided in a fluid state,
    b. continuously pouring the first glass onto a flat support to form a sheet of glass on the support,
    c. continuously pouring the second glass onto the surface of the first glass sheet to form a second sheet of glass having an interface with the first glass sheet,
    d. thermally interdiffusing the two glass compositions across the interface to produce the desired compositional gradient in the bar, and
    e. cooling the thermally interdiffused bar thus produced to a solid, wherein a predetermined profile of the gradient of composition is prepared by selecting the position of the interface of the sheets and by regulating the temperature and the duration of their thermal interdiffusion.

2. Method according to claim 1, characterized by regulating the ratio of the pouring flow rates of the two sheets to adjust the position of the interface.

3. Method according to claim 1 characterized by preparing more than two different glass compositions in the fluid state, the glasses having different densities, and successively pouring a sheet of each of these glass compositions one atop the other on the flat support in order of decreasing density.

4. Method according to claim 3 characterized by transversely cutting the solid bar into bar elements and thermally treating the bar elements to effect a desired degree of interdiffusion of the layers which comprise them.

5. Method according to claim 3 characterized by thermally treating the bar elements to establish a gradient of composition that corresponds to a predetermined gradient of refractive indices.

6. Method according to claim 1 characterized by continuously cutting the solid bar into bar elements and thermally treating the bar elements to ensure interdiffusion of the layers in the elements.

7. Method according to claim 6 characterized by thermally treating the bar elements to establish a gradient of composition that corresponds to a predetermined gradient of refractive indices.

8. Method according to claim 1 which comprises providing a flat support, arranging at least two reservoirs of molten glass in a spaced relationship above the flat support, continuously delivering a sheet of glass from each reservoir by gravity flow, and successively depositing the sheets atop one another on the support to form a stack.

* * * * *